Patented Aug. 16, 1938

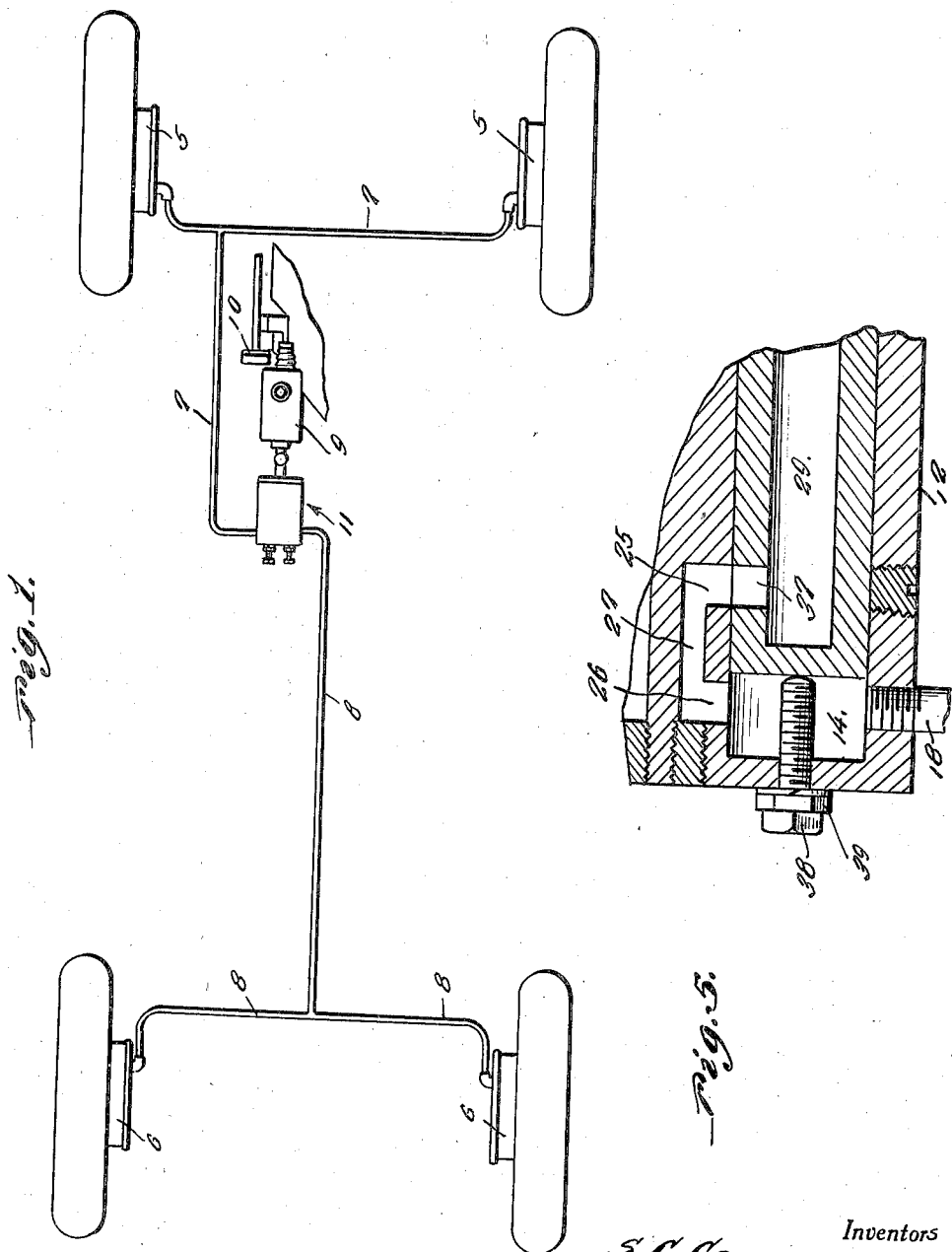

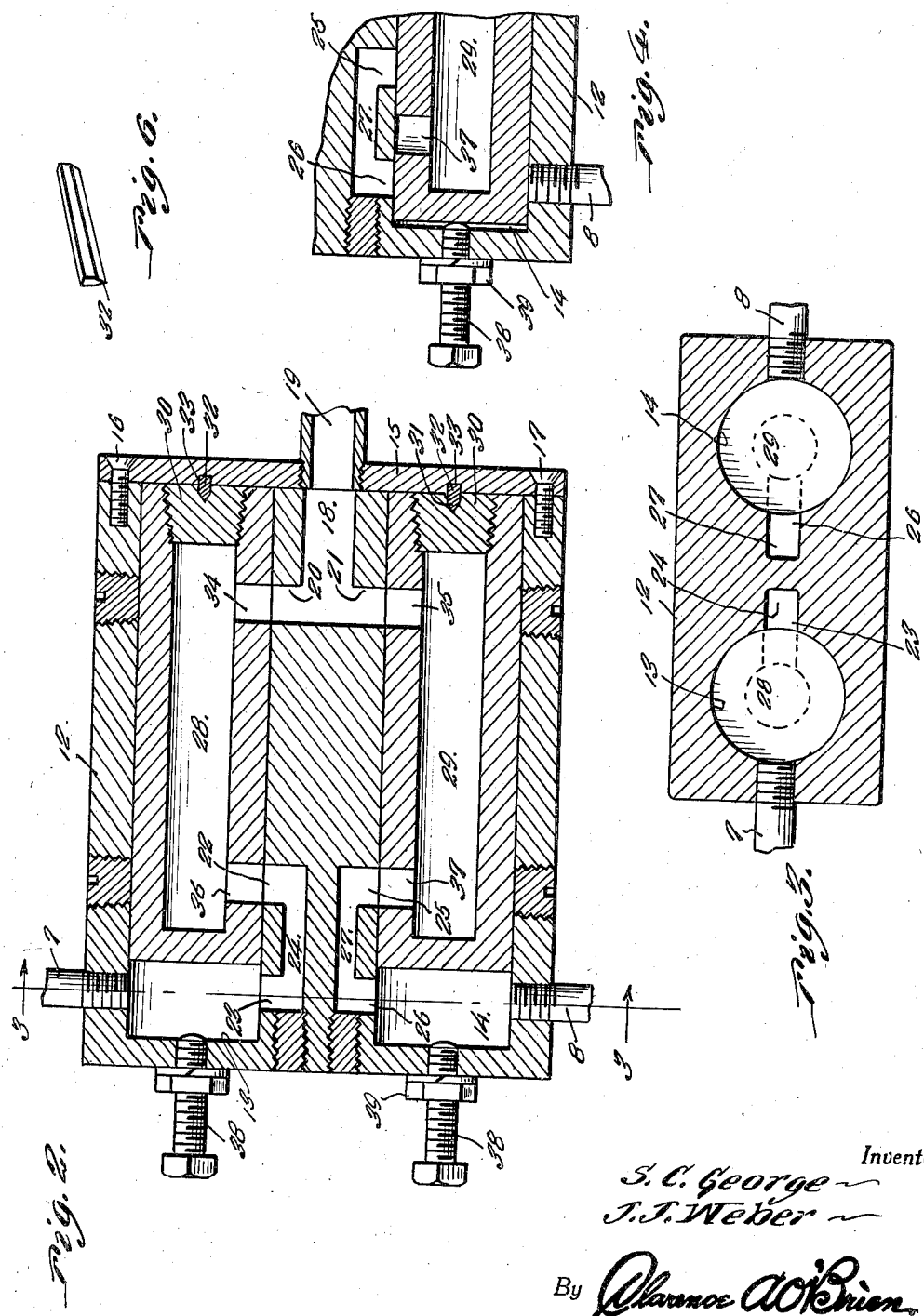

2,127,399

UNITED STATES PATENT OFFICE 2,127,399

SAFETY DEVICE FOR HYDRAULIC BRAKE SYSTEMS

REISSUED

Simon C. George, Greensburg, and John J. Weber, Pittsburgh, Pa.; said John J. Weber assignor to Edna C. Weber, Pittsburgh, Pa.

Application February 16, 1937, Serial No. 126,052

4 Claims. (Cl. 303—84)

This invention relates broadly to hydraulic brake systems for automobiles and more particularly to a device for use in conjunction with such systems as a safety measure.

In accordance with the present invention means is provided in a hydraulic brake system whereby in the event of the breakage or occurrence of a leak in the fluid line leading to either the front or rear wheel brakes the flow of fluid through the leaking line will be automatically arrested while at the same time the fluid may flow through the unaffected line for applying the wheel brakes associated with said line.

A further object of the invention is to provide a device of this character which may be used with equal facility in the air brake system of commercial vehicles.

A still further object of the invention is to provide a device of this character which is free of springs, etc., which might break or otherwise get out of order thereby rendering the device ineffective for the purpose intended.

The invention together with its objects and advantages will be best understood from a study of the following description taken in connection with the accompanying drawings wherein—

Figure 1 is a plan view illustrating the application of the invention to a hydraulic vehicular brake system.

Figure 2 is an enlarged sectional view through the safety device.

Figure 3 is a transverse sectional view taken substantially on the line 3—3 of Figure 2.

Figure 4 is a fragmentary detail sectional view showing the position of one of the hollow plungers when a break occurs in the line connected with the cylinder in which said plunger operates.

Figure 5 is a view somewhat similar to Figure 4 and illustrating the use of the adjusting screw for bleeding the safety device.

Figure 6 is a perspective view of a key hereinafter more fully referred to.

Referring to the drawings by reference numerals it will be seen that the numerals 5—5 indicate the brakes associated with the front wheels of an automobile while the numerals 6—6 indicate the brakes associated with the rear wheels of a vehicle. The fluid feed line for the brakes 5 is indicated by the reference numeral 7 while the fluid feed line for the wheel brakes 6 is indicated by the reference numeral 8. The master cylinder assembly of the hydraulic brake system is indicated generally by the reference numeral 9 and the brake pedal connected with the master piston is indicated by the reference numeral 10.

Our improved safety device is indicated generally by the reference numeral 11.

As clearly shown in Figures 2 to 6, inclusive the improved safety device 11 comprises a block or casting 12 suitably bored to provide a pair of cylinders 13 and 14 respectively, open at one end and at said open end being closed by a plate indicated by the reference numeral 15. The cover plate 15 is secured to the block or casting 12 through the medium of screws or other suitable fastening elements 17.

Between the cylinders 13 and 14 the casting or body block 12 at one end is provided with an inlet passage 18 that is suitably connected as at 19 with the outlet of the master cylinder 9.

Also for the cylinders 13 and 14 there are provided at the inner ends of the passage 18 lateral ports 20, 21 respectively while at the end thereof remote from the ports 20, 21 the body block or casting 12 is suitably bored to provide for the cylinder 13 lateral ports 22, 23 connected by a passage 24; and to provide lateral ports 25, 26 for the cylinder 14 and a passage 27 connecting the ports 25 and 26.

The cylinder 13 is connected with the fluid conduit 7 for the front wheel brakes 5 while the cylinder 14 is connected with the conduit 8 for the rear wheel brakes 6.

Having a sliding fit within the respective cylinders 13 and 14 are hollow sliding valve members 28 and 29 respectively. The valve members 28, 29 are open at one end and at said one end are internally threaded for the reception of plugs 30.

For retaining the members 28, 29 against rotative movement within the respective cylinders 13 and 14 the plugs 30 are provided with kerfs or ways 31 which receive the bevelled edges of keys 32 that are also engaged in grooves 33 provided therefor on the inner face of the cover plate 15 as clearly shown in Figure 2.

The valve members 28, 29 at one end are respectively provided with lateral ports 34, 35 respectively for registry with the ports 20, 21. Adjacent the other end thereof the respective valve members 28, 29 are provided respectively with lateral ports 36, 37, the port 36 of the valve member 28 registering with the port 22 when ports 34 and 20 are in registry. Similarly the port 37 of the valve member 29 is in registry with the port 25 when ports 21 and 35 are in registry, and is out of registry with port 25 when ports 21 and 35 are out of registry.

From the foregoing it will be seen that normally the valves 28 and 29 are in the position shown in Figure 2 so that when the brake pedal 10 is depressed for applying the wheel brakes fluid from the master cylinder 9 flows through the valve members 28 and 29 to the lines 7 and 8 and through the lines 7 and 8 to the brakes 5 and 6 for applying the said brakes simultaneously.

Assuming, for example, that a leak should occur in the line 8 it will be seen that immediately pressure is released under valve 29 causing valve 29 to drop without or by depressing pedal 10 for applying the wheel brake the pressure fluid within the valve member 29 will cause the latter to shift from the position shown in Figure 2 toward the left of said figures whereby port 35 is moved out of registry with port 21 and port 37 moved out of registry with port 25 and out of registry with port 26. In this position valve member 29 will serve to cut off the flow of fluid from the master cylinder to the line 8 this preventing further loss of fluid. At the same time the valve member 28 would remain in the position shown in Figure 2 so that the fluid from the master cylinder would pass through the passage 18 aligned ports 20 and 34 into the valve 28 and from the valve 28 through the ports 36 and 22, flowing through the passage 24 to return to the cylinder 13 through the port 23 then passing from the cylinder 13 through the line 7 to the vehicle brakes 5. From this description of the operation of the device the manner in which the device will operate in the event of breakage in the line 7 is thought to be obvious.

For resetting a valve member 28 and 29 as the case may be, after the repair to the broken line has been made, or for bleeding the brakes in the usual manner for servicing the device recourse is had to the proper adjusting screw 38 there being provided one adjusting screw 38 for each cylinder, the screw being threaded through the end wall of the cylinder remote from the cover plate 15 and provided with a lock nut 39. In servicing the device by bleeding the brakes the selected screw 38 is threaded inwardly to the position shown in Figure 5 to engage the adjacent end of the associated valve 28 or 29 either to hold the valve in position shown in Figure 5 or to shift the valve from the position shown in Figure 4 to the position shown in Figure 5 whereby the fluid may flow from the valve 28 or 29, as the case may be, through the ports 36, 22 passage 24 and port 23 back into the cylinder 13 in the case of valve 28, and through the ports 37, 25, passage 27 and port 26 in the case of the valve 29.

It is thought that a complete understanding of the construction, utility and advantages of an invention of this character will be had without a more detailed description.

Having thus described the invention what is claimed as new is:

1. In a hydraulic brake system for vehicles, the combination with the front and rear vehicular wheel brakes, a master cylinder, a conduit for supplying fluid from the master cylinder to the front wheel brakes, and a conduit for supplying fluid from the master cylinder to the rear wheel brakes, of a device interposed between the master cylinder and said conduits and providing a connection between the master cylinder and the respective conduits, said device including independently operable hollow valve means for each conduit and through which the fluid passes, ports in the valves communicating with the conduits, said valves being slidably operable to cut off the flow of fluid through the ports in the event of leakage in the conduit without retarding the flow of fluid through the unaffected conduit.

2. In a hydraulic brake system for vehicles, the combination with the front and rear vehicular wheel brakes, a master cylinder, a conduit for supplying fluid from the master cylinder to the front wheel brakes, and a conduit for supplying fluid from the master cylinder to the rear wheel brakes, of a device interposed between the master cylinder and said conduits and providing a connection between the master cylinder and the respective conduits, said device including a pair of cylinders, one for each conduit, and hollow valve members having a sliding fit within the respective cylinders and normally maintained in one position by pressure of the fluid in said conduits, said cylinders and valves having registrable ports providing communicating through the valve with the respective conduits and said valves being operable to shift to a second position for cutting off the flow of fluid to an affected conduit when the pressure is reduced in said affected conduit.

3. A safety device for hydraulic brake apparatus and the like, provided with a bore constituting a cylinder having a lateral intake port at one end and and at a relatively opposite end being provided with a pair of relatively spaced lateral ports and a passage connecting said ports, and a hollow cylindrical valve member having a sliding fit within said cylinder and movable with the hydraulic fluid feeding through the brake apparatus and said valve in the event of breakage in a conduit of the brake apparatus, said hollow valve member being provided adjacent one end thereof with a lateral port normally registering with the first mentioned lateral port of the cylinder and said valve member adjacent its relatively opposite end being provided with a lateral port normally registering with one of said pair of ports to provide for a free flow of fluid through the cylinder and said valve member under normal working conditions.

4. In a hydraulic brake system for vehicles, the combination with the front and rear vehicular wheel brakes, a master cylinder, a conduit for supplying fluid from the master cylinder to the front wheel brakes, and a conduit for supplying fluid from the master cylinder to the rear wheel brakes, of a device interposed between the master cylinder and said conduits and providing a connection between the master cylinder and the respective conduits, said device including a pair of cylinders, one for each conduit, and hollow valve members having a sliding fit within the respective cylinders and normally remaining in one position to provide for a free flow of fluid through the valve members, and also being operable to shift to a second position for cutting off the flow of fluid to an affected conduit, and an adjusting screw threaded in one end of each of said cylinders to engage an end of the valve member therein for moving the valve member to one position of adjustment and holding said valve member in said position of adjustment, as and for the purpose specified.

SIMON C. GEORGE.
JOHN J. WEBER.